United States Patent
Thommana et al.

(10) Patent No.: US 12,120,530 B2
(45) Date of Patent: Oct. 15, 2024

(54) EXPLOITING MULTI-RADIO DUAL CONNECTIVITY (MR-DC) FOR ROBUST TACTICAL 5G

(71) Applicant: Rockwell Collins, Inc., Cedar Rapids, IA (US)

(72) Inventors: John V. Thommana, Cedar Rapids, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 419 days.

(21) Appl. No.: 17/542,167

(22) Filed: Dec. 3, 2021

(65) Prior Publication Data

US 2023/0180012 A1    Jun. 8, 2023

(51) Int. Cl.
| | | |
|---|---|---|
| *H04W 16/14* | (2009.01) | |
| *H04W 12/00* | (2021.01) | |
| H04W 72/0453 | (2023.01) | |
| *H04W 76/16* | (2018.01) | |
| H04W 80/02 | (2009.01) | |
| H04W 84/04 | (2009.01) | |

(52) U.S. Cl.
CPC ......... *H04W 16/14* (2013.01); *H04W 12/009* (2019.01); *H04W 72/0453* (2013.01); *H04W 76/16* (2018.02); *H04W 80/02* (2013.01); *H04W 84/045* (2013.01)

(58) Field of Classification Search
CPC ............... H04W 16/14; H04W 12/009; H04W 72/0453; H04W 76/16; H04W 80/02; H04W 84/045; H04W 88/06; H04W 88/10; H04W 92/20; H04W 12/033; H04K 3/255; H04K 2203/16; H04K 3/25; H04K 3/41; H04L 63/0272
See application file for complete search history.

(56) References Cited

U.S. PATENT DOCUMENTS

| | | | |
|---|---|---|---|
| 10,243,929 B2 | 3/2019 | Lee et al. | |
| 2005/0210234 A1* | 9/2005 | Best ................... | H04W 12/033 |
| | | | 713/151 |
| 2017/0048278 A1* | 2/2017 | Tomasso ............ | H04L 63/0272 |
| 2019/0261425 A1 | 8/2019 | Park et al. | |
| 2020/0366402 A1* | 11/2020 | Dunn ..................... | H04K 3/41 |

(Continued)

OTHER PUBLICATIONS

2020 DOD Communication Waveform Inventory, Approval for Public Release Mar. 24, 2021, 2 pages.

(Continued)

*Primary Examiner* — Kiet Tang
(74) *Attorney, Agent, or Firm* — Suiter Swantz IP

(57) ABSTRACT

A communication system is described. The communication system includes 5g base stations (gNodeB) which are communicatively coupled to a user equipment (UE) by a multiple radio access technology (multi-RAT) dual connectivity. A first of the gNodeBs is a master gNodeB which relays control signaling from a 5G network core to a secondary gNodeB. To avoid spectral interference of the control signals between the master gNodeB and the secondary gNodeB, the control signals are transmitted according to a tactical waveform protocol selected from the Department of Defense (DoD) Communication Waveform Inventory (2020), such as a common data link (CDL) protocol.

13 Claims, 7 Drawing Sheets

(56) References Cited

U.S. PATENT DOCUMENTS

2021/0058792 A1   2/2021  Bhushan et al.
2021/0120390 A1   4/2021  Alvarino et al.
2021/0175995 A1   6/2021  Ju

OTHER PUBLICATIONS

Arjoune, Youness et al., "Smart Jamming Attacks in 5G New Radio: A Review", School of Electrical Engineering and Computer Science, University of North Dakota, Grand Forks, ND, Downloaded Dec. 3, 2021, 7 pages.
ATP 6-02.53, "Techniques for Tactical Radio Operations", Army Techniques Publication, Feb. 13, 2020, 210 pages.
Lichtman, Marc Lous et al., "5G NR Jammingm Spoofing and Sniffing: Threat Assessment and Mitigation", Conference Paper, May 2018, arXiv:1803.03845v2 [cs.NI] Apr. 8, 2018, 7 pages.
Maxen, Fredrik, Naval Pregraduate School, Monterey, CA, Thesis, "A Comparative Analysis of Network Approaches for Tactical Wireless Communications, Validated by Joint Communication Simulation System (JCSS) Simulations: A Swedish Perspective", Sep. 2011, 110 pages.
Etsi Etsi: ETSI TS 133 501 V16.3.0, Aug. 2018, pp. 2020-2028.
Extended European Search Report dated Aug. 3, 2023; European Application No. 22211032.2.
Francisco Sandoval et al. "Hybrid Peak-to-Average Power Ratio Reduction Techniques: Review and Performance Comparison", IEEE ACCESS, vol. 5, Dec. 22, 2017, pp. 27145-27161.

\* cited by examiner

EXPLOITING MULTI-RADIO DUAL CONNECTIVITY (MR-DC) FOR ROBUST TACTICAL 5G

TECHNICAL FIELD

The present invention generally relates to communication systems, and more particularly to denial resistant communication.

BACKGROUND

In a 5G network, an Xn interface (e.g., Xn-C interface and/or Xn-U interface) between gNodeBs is supported over a wired network or over a 5G wireless network (e.g., front-haul or backhaul). Where one or more of the gNodeBs are implemented in a mobile platform, providing the Xn interface by wired network is not possible. Depending upon the surrounding environment, the Xn interface supported over the 5G wireless network may be subject to jamming by spectral interference. Therefore, it would be advantageous to provide one or more of a device, system, or method that cures the shortcomings described above.

SUMMARY

Embodiments of the present disclosure are directed to a communication system. In one embodiment, the communication system includes a 5G core network. The 5G core network is communicatively coupled to an external network by a satellite communication. In another embodiment, the external network is one of a secret internet protocol router network (SIPRNet) or a non-classified internet protocol router network (NIPRNet). In another embodiment, the communication system includes a master 5G base station node (gNodeB) communicatively coupled to the 5G core network by a control plane (N2) interface and a user plane (N3) interface. In another embodiment, the communication system includes a first mobile platform. In another embodiment, the first mobile platform includes a secondary gNodeB. The secondary gNodeB is communicatively coupled to the master gNodeB by an Xn control plane (Xn-C) interface and an Xn user plane (Xn-U) interface of which at least the Xn-C interface is transmitted according to a denial resistant protocol selected from the DoD communication waveform inventory, such as a Common Data Link (CDL) protocol. In another embodiment, the communication system includes at least one user equipment (UE). The at least one UE is communicatively coupled to the master gNodeB by a first Uu interface and is communicatively coupled to the secondary gNodeB by a second Uu interface. Each of the first Uu interface and the second Uu interface include a control signaling plane and a user traffic plane. The at least one UE further generates an aggregated control signaling plane by aggregating the control signaling plane of the first Uu interface and the second Uu interface by multiple radio access technology (RAT) dual connectivity (MR-DC).

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
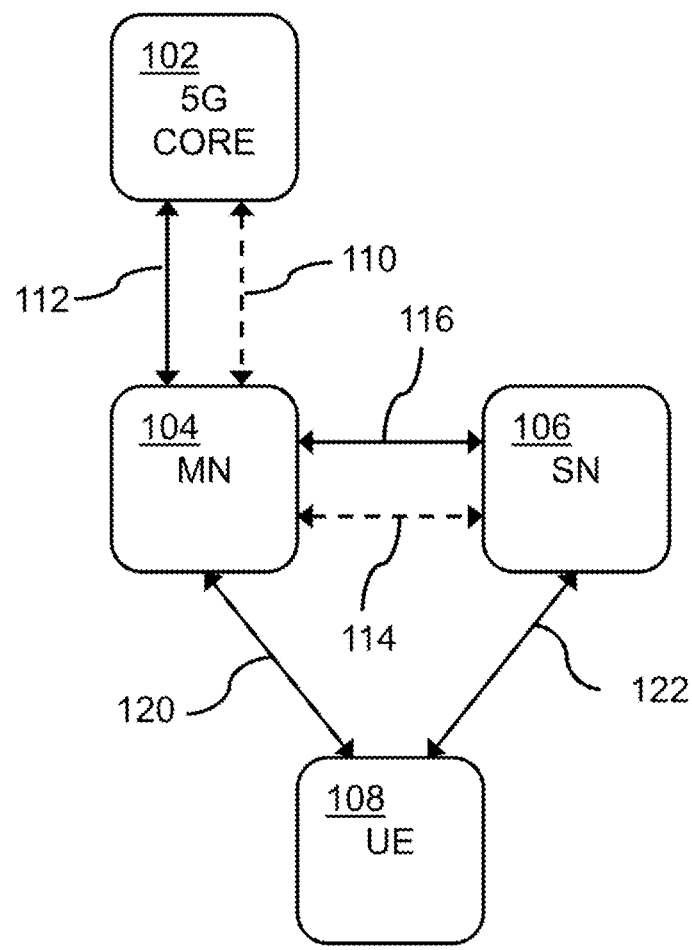
FIGS. 1A-1B depict a 5G network, in accordance with the prior art.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive "or". For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Various 5G cellular communication standards have been set forth for 5G networks. 5G standards set forth two protocol stacks, a user plane and a control plane. The 5G standards have proscribed a number of channels and signals for the protocol stacks.

5G new radio (5G NR) may include a number of channels, such as, but not limited to, logical channels (e.g., control channels and traffic channels), transport channels, and physical channels. Each of the logical channels, transport channels, and physical channels may further be broken down into various groups. For example, the physical channels of 5G NR may include, but are not limited to, physical downlink channels or physical uplink channels. The physical downlink channels may include, but are not limited to, a physical downlink shared channel (PDSCH), a physical broadcast channel (PBCH), or a physical downlink control channel (PDCCH). The PDSCH may carry encoded system information required by the UE to access the network. The PBCH may carry encoded user data and paging information to the UE. In some instances, the BBCH may include a PBCH demodulated reference signal (PBCH DMRS), which may carry a reference signal for decoding the encoded PBCH signal. The PDCCH may carry encoded control information and scheduling decisions for receiving the PDSCH. The physical uplink channels may include, but are not limited to, a physical uplink shared channel (PUSCH), a physical uplink control channel (PUCCH), or a physical random-access channel (PRACH). The PUSCH may be the compliment of the PDSCH and may carry encoded system information required by the UE to access the network. The PUCCH may carry uplink control data. The PRACH may be used for channel access.

5G NR may also include a number of signals. For example, the signals of 5G NR may include, but are not limited to, synchronization signals. The synchronization signals may include, but are not limited primary synchronization signals (PSS) and secondary synchronization signals (SSS). The PSS and the SSS may be used for downlink frame synchronization by frame, slot, and symbol timing.

Figure 1B:
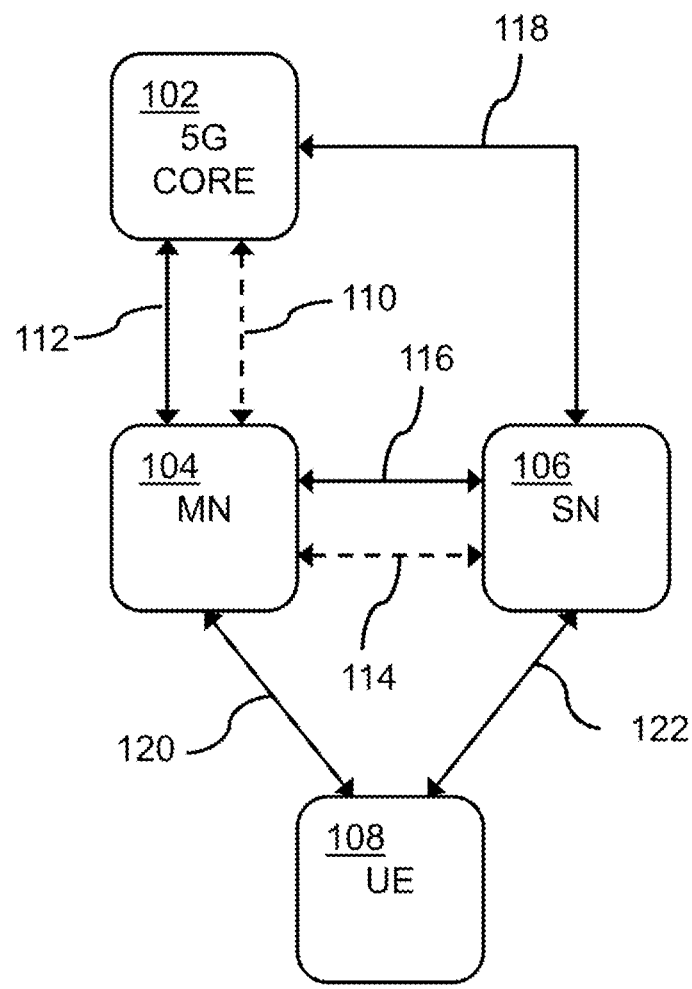

Referring now to FIGS. 1A-1B, a 5G network 100 is described, in accordance with the prior art.

A 5G network 100 may include a 5G core network 102, one or more 5G base station nodes (also referred to as gNodeB, gNB, or 3GPP 5G Next Generation Node B base station), and one or more user equipment 108 (also referred to as UE or cellular phone). For example, the 5G base station nodes may include a master gNodeB 104 (also referred to as MN) and a secondary gNodeB 106 (also referred to as SN). The 5G core network may authenticate and control user traffic to and from the master gNodeB and the secondary gNodeB for communicating with the UEs. The 5G core network and the master gNodeB may include a control plane interface 110 (also referred to as N2). The control plane interface 110 (N2) may provide control signals between the 5G core network and the master gNodeB. The control signals may be for one or more purposes, such as authenticating users. The 5G core network and a master gNodeB may also include a user traffic plane interface 112 (also referred to as N3). The user traffic plane interface 112 (N3) may provide user traffic signals between the 5G core network and the master gNodeB. The user traffic signals may be for one or more purposes such as for routing user traffic. In some instances, one or more of the control plane interface 110 and the user traffic plane interface 112 may be either a standard 5G commercial link or carried over a military link. The military link may include, but is not limited to, a line-of-sight (LOS) waveform or a beyond-line-of-sight (BLOS) waveform.

In a typical 5G instantiation, only the Master gNodeB has the control plane interface 110 (N2) to the 5G Core Network. To provide control signals to the secondary gNodeB from the 5G Core Network, the master gNodeB and the secondary gNodeB may include an Xn-C interface 114. Control information for the secondary gNodeB is transferred between the master gNodeB and the secondary gNodeB via the Xn-C interface 114. The master gNodeB and the secondary gNodeB may also include an Xn-U interface 116. User plane traffic information for the secondary gNodeB is transferred between the master gNodeB and the secondary gNodeB via the Xn-U interface.

In some instances, the 5G core network and a secondary gNodeB may include a user traffic plane interface 118 (N3) (see FIG. 1B). The user traffic plane interface 118 (N3) may provide a means for transferring user traffic information between the 5G core network and the secondary gNodeB. If the secondary gNodeB does not have the user traffic plane interface 118 with the 5G core network 102 (see FIG. 1A), then the master gNodeB 104 routes the user plane traffic to the secondary gNodeB 106 via the Xn-U interface 114.

The UE 108 may include any suitable device for communicating with the gNodeBs, such as, but not limited to, a cellular phone or any device equipped for a cellular network connection. The gNodeBs and the UE may include an air interface. For example, the air interface may include a wideband LTE/LTE-A mode, commonly referred to as Universal Mobile Telecommunications System interface, UMTS interface, UTMS, Uu interface or Uu. The Uu interface may include a physical layer and a data link layer. For example, the Uu interface may be a 5G cellular waveform.

In the 5G network, the master gNodeB 104 may broadcast system information to the UE 108 by way of the Uu interface 120. Similarly, the secondary gNodeB 106 may broadcast system information to the UE 108 by way of the Uu interface 122. The system information may be broadcast to acquire radio frame timing and system frame number (SFN) from the UE 108. In some instances, the secondary gNodeB 106 may broadcast only a limited amount of the system information. By broadcasting the limited amount of system information, network overhead may be reduced. The UE 108 may instead acquire the required broadcast system information from the master gNodeB 104.

In some instances, the UE 108 may connect with multiple gNodeBs by Multi-Radio Access Technology (multi-RAT). The 5G standards support up to 16 transmit and 16 receive chains. Due to practical size, weight, and power considerations (SWAPC) of the UE 108, typical UEs are currently limited to connectivity to one master gNodeB and one secondary gNodeB, also referred to as dual connectivity or multi-RAT dual connectivity (MR-DC). By the multi-RAT dual connectivity, the UE 108 with multiple transmit and receive chains may connect to two gNodeBs to obtain service. The multi-RAT dual connectivity may then be used for capacity improvement, throughput improvement, load balancing, increasing the number of subscribers in the network, and to minimize handoff failures.

The 5G core network may further connect the radio access network with a core network known in the art. Thus, 5G cellular communication may be established between the UE and the core network, by way of the gNodeBs.

The 5G cellular communication may be vulnerable to physical layer denial (e.g., jamming). 5G waveforms are more resilient to physical layer denial, as compared to previous cellular communications, such as LTE. However, one or more of the control channels of the 5G cellular communication may be denied with much lower complexity and power requirements, as compared to the data traffic channels. For example, the Xn-C interface 114 may be one interface which is subject to physical layer denial. By way of another example, the 4G/5G Uu control channels between the gNodeB and the UE may also be subject to spectral interference.

Referring generally to FIGS. 2A-4. Embodiments of the present disclosure are generally directed to a 5G network which is configured to protect the channels of 5G communications from physical layer denial. In particular, the control channels, and optionally the data traffic channels, between master and secondary base stations nodes may be transmitted with a protocol which is more resistant to physical layer denial. The control channels, and optionally the data traffic channels, between the gNodeBs (master or secondary) and the UE may also be transmitted with a protocol which is more resistant to physical layer denial. For example, the Xn interface from the master gNodeB to the secondary gNodeB may be transmitted by a Common Data Link (CDL) protocol. The CDL protocol may include a tactical waveform with a high data rate and be robust to physical layer denial. In some instances, the CDL protocol may be a directional bandwidth efficient CDL (directional BE-CDL) waveform. The directional BE-CDL waveform may improve a likelihood of the secondary gNodeB receiving the Xn interface from the master gNodeB when subjected to attempts at physical layer denial. Similarly, the protocol which is resistant to physical layer denial may include any other waveform protocols selected from the Department of Defense (DoD) inventory (2020), such as, but not limited to, CDL, BE-CDL, Warrior Robust Enhanced Network (WREN), Link 16, Tactical Targeting Network Topology (TTNT), Multifunction Advanced Data Link (MADL), Intra-Flight Data Link (IFDL), Wideband Networking Waveform (WNW), Soldier Radio Waveform (SRW), and the like.

Figure 2A:
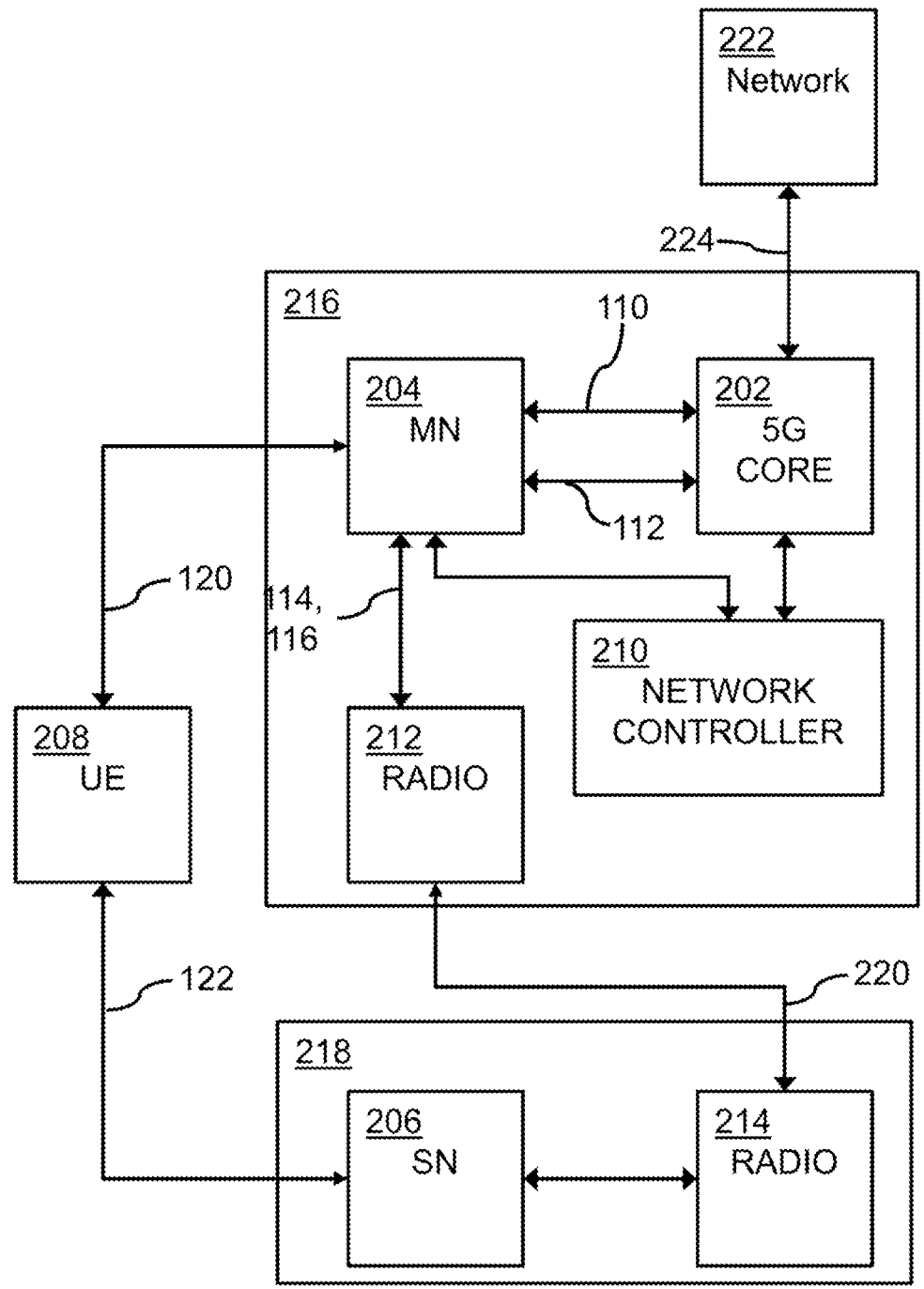
FIGS. 2A-2C depicts a simplified schematic diagram of a communication system, in accordance with one or more embodiments of the present disclosure.
Figure 2B:
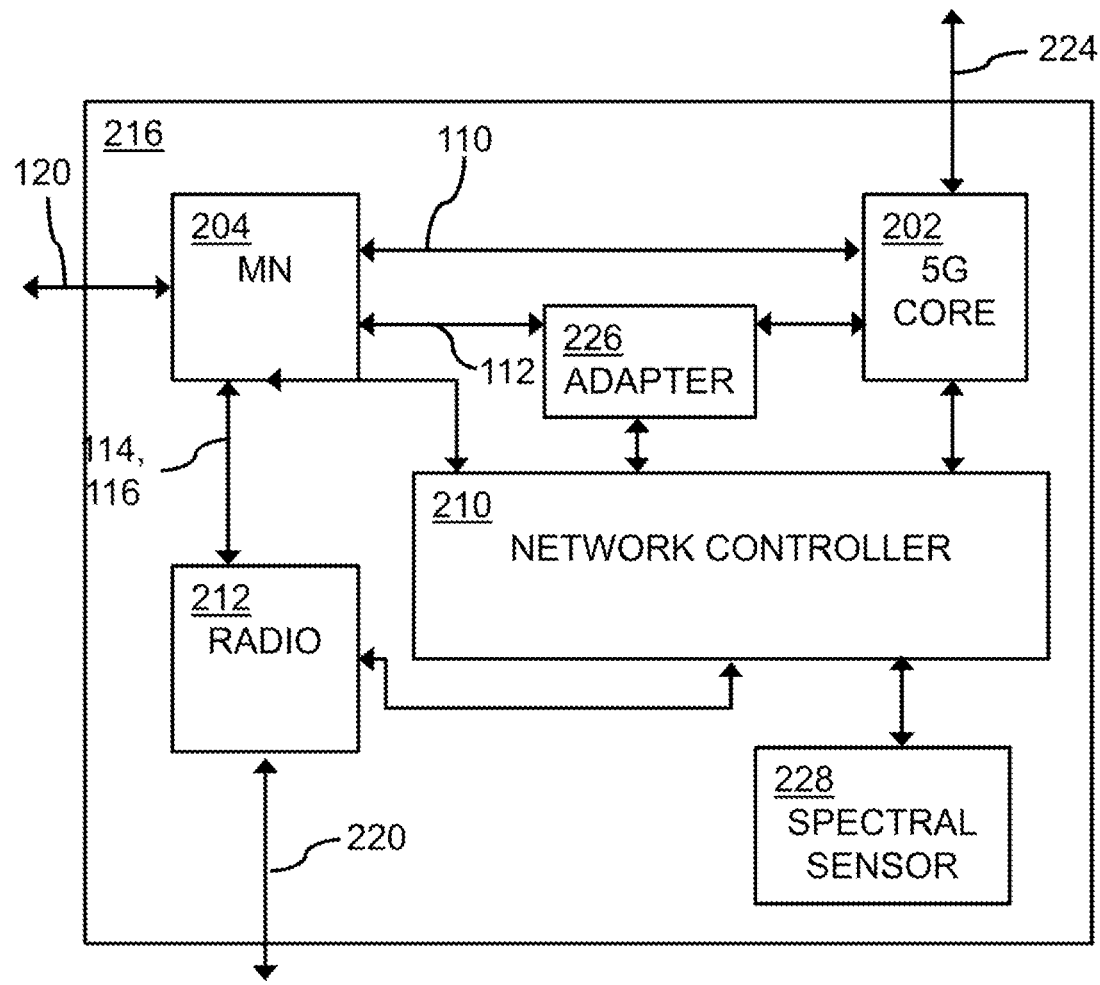
Figure 2C:
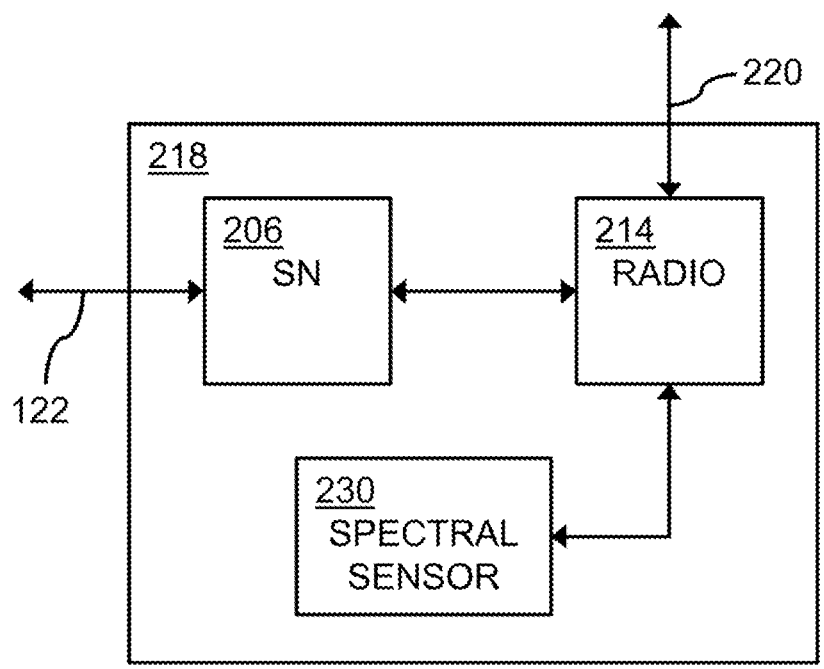

Referring now to FIGS. 2A-2C, a communication system 200 is described, in accordance with one or more embodiments of the present disclosure. The communication system 200 may include one or more of a 5G core network 202, a master gNodeB 204, a secondary gNodeB 206, a UE 208, a network controller 210, a tactical radio 212, and a tactical radio 214. In some embodiments, the communication system 200 may further include a mobile platform 216. The mobile platform 216 may include one or more of the 5G core network 202, the master gNodeB 204, the network controller 210, and the tactical radio 212. In some embodiments, the communication system 200 may further include a mobile platform 218. The mobile platform 218 may include one or more of the secondary gNodeB 206, and the tactical radio 214. The mobile platform 216, 218 may include any mobile platform known in the art, such as, but not limited to, an airborne mobile platform (e.g., helicopter, aircraft, airborne early warning and control system (AWACS), unmanned aircraft, etc.), terrestrial mobile platform (e.g., Humvee, manpack, etc.), maritime mobile platform, or space borne mobile platform. Furthermore, although the 5G core network 202 and the master gNodeB 204 are depicted as being co-located on the mobile platform 216, this is not intended as a limitation on the present disclosure. In some embodiments, the 5G core network 202 and the master gNodeB 204 may be geographically separated on separate (mobile or stationary) platforms. By separating the 5G core network 202 from the master gNodeB 204, the 5G core network 202 may then control multiple of the master gNodeBs 204, with each of the master gNodeBs 204 associated with one or more of the secondary gNodeBs 206.

The 5G core network 202 may establish bidirectional communication with an external network 222 which is beyond-line-of-sight (BLOS) of the platform 216. For example, the 5G core network 202 may establish the communication by a BLOS waveform such as, but not limited to, a satellite communication waveform (e.g., mobile user objective system (MUOS) waveform, Demand Assigned Multiple Access and Integrated Waveform (DAMA/IW), a commercial waveform (e.g., Iridium), etc.) or a waveform reflected by the earth's ionosphere (e.g., a high frequency (HF) waveform, a wideband high frequency (WBHF) waveform, etc.). In some embodiments, the external network to which the 5G core network connects is a government network. The government network may include, but is not limited to, a Secret Internet Protocol Router Network (SIPR-Net) or a non-classified internet protocol router network (NIPRNet).

The 5G core network 202 may connect the master gNodeB 204 and the secondary gNodeB 206 (e.g., the radio access networks) with the external network by any means known in the art, such as, but not limited to, the N6 interface 224 between the external network and a user plane function in the radio access network. Such N6 interface 224 may be by a direct hop satellite communication or a multi-hop satellite communication, such satellite communication being transmitted a ground infrastructure with connectivity to the NIPRNet or the SIPRNet. For example, mobile user objective system (MUOS), link 16, demand assigned multiple access (DAMA), are examples of such satellite communication.

The master gNodeB 204 may be communicatively coupled to the secondary gNodeB 206 by an Xn-C interface 114 and an Xn-U interface 116. The Xn-C interface 114 and the Xn-U interface 116 may be transmitted according to a tactical waveform 220 protocol. By transmitting the Xn-C interface 114 according to the tactical waveform 220 protocol, a robust signaling channel may be provided between the master gNodeB 204 and the secondary gNodeB 206. A likelihood of the control signals between the master gNodeB 204 and the secondary gNodeB 206 becoming denied due to spectral interference may be reduced by the robust signaling channel. Thus, the secondary gNodeB 206 may be coordinated with the master gNodeB 204, for establishing the Uu interfaces to the UE 208. Similarly, the Xn-U interface may be transmitted according to the tactical waveform protocol (e.g., CDL), a 5G new radio (NR) protocol, or another protocol known in the art.

The tactical waveform 220 may be transmitted in a band such as, but not limited to, the L band, S band, C band, X band, Ku band, or Ka band. In some embodiments, an out-of-band approach channel or alternate signaling channel may be provided between the gNodeBs. In this regard, the band may be outside of a 5G new radio frequency range 1 (FR1) of between 450 MHz to 6 GHz; wherein the band is outside of a 5G new radio frequency range 2 (FR2) of between 28 GHz to 71 GHz.

The tactical waveform 220 may include a number of non-commercial waveforms which may include anti-jamming or anti-spoofing techniques which are suitable for operation in contested environments. In some embodiments, the tactical waveform 220 protocol is a Common Datal Link (CDL) protocol, such as, but not limited to, a directional bandwidth efficient common data link (directional BE-CDL). The directional BE-CDL waveform may support a variety of bands, such as, but not limited to, L band, S band, C band, X band, Ku band, or Ka band. The directional BE-CDL protocol may also include higher EIRP limitations, as compared to the 5G cellular protocols. The directional BE-CDL protocol may also support classified modes with higher anti-jam or LPI/LPD to control spectral emissions. The tactical waveform protocol may also include any waveform selected from the Department of Defense (DoD) Communications Waveform Inventory (2020), such as, but not limited to, CDL, BE-CDL, Warrior Robust Enhanced Networking (WREN), Warrior Robust Enhanced Network Narrowband (WREN-NB), Link 16, Tactical Targeting Network Topology (TTNT), Multifunction Advanced Data Link (MADL), Intra-Flight Data Link (IFDL), Wideband Networking Waveform (WNW), Soldier Radio Waveform (SRW), and the like.

To transmit one or more of the Xn-C interfaces 114 and the Xn-U interface 116 according to the tactical waveform 220 protocol, the master gNodeB 204 is coupled to the tactical radio 212 and the secondary gNodeB 206 is coupled to the tactical radio 214. In this regard, the platform 216 may include the tactical radio 212 and the platform 218 may include the tactical radio 214.

Tactical Radios and Tactical Waveforms are generally described in "A Comparative Analysis of Network Approaches For Tactical Wireless Communications, Validated By Joint Communication Simulation System (JCSS) Simulations: A Swedish Perspective", by Fredrik Maxen 2011; and "Techniques for Tactical Radio Operations", Army Techniques Publication (ATP) 6-02.53, both of which are incorporated herein by reference in its entirety.

The tactical radios 212, 214 may include any tactical radio, such as, but not limited to, a manpack, a handheld radio, a vehicular radio, or an airborne radio. As may be understood, any combination of single, two-channel, multi-channel tactical radios can be used to create network topologies that are mission specific. The tactical radios 212, 214 may include any number of software-defined radio (SDR) capable of hosting waveforms which are transmitted or received according to the tactical protocol. As may be understood, such SDRs may include a number of components, permutations, and arrangements, which are not set forth herein for clarity. For example, SDRs may include, but are not limited to, an army navy AN/ARC-210 radio or an AN/PRC 162 radio. The tactical radios may also modulate and demodulate traffic signals.

Both the master gNodeB 204 and the secondary gNodeB 206 may be configured to broadcast all the required system information to the UE 208 by the Uu interface. By broadcasting all the required system information from both the master gNodeB 204 and the secondary gNodeB 206, a likelihood of the UE 208 receiving the system information improved. Such dual broadcast is beneficial in instances where the broadcast from the master gNodeB 204 is unlikely to be received by the UE 5G node, such as when the Uu broadcast from the master gNodeB 204 is experiencing spectral interference.

In some instances, system information provided from the master gNodeB 204 to the UE 208 by way of the Uu interface 120 is not guaranteed to be received, such as due to spectral interference. The secondary gNodeB 206 supports signaling radio bearer 3 (SRB3). By supporting SRB3, the secondary gNodeB 206 may exchange radio resource control (RRC) messages with the UE 208 in dual connectivity mode with the master gNodeB 204. The secondary gNodeB 206 supports SRB-3 so that UE 208 can exchange radio resource control (RRC) and user traffic messages with one or more of the master gNodeB 204 or the secondary gNodeB 206. Thus, the secondary gNodeB 206 broadcasts system information by the Uu interface 122, allowing the dual connected UE 208 to remain connected to the network even if the UE 208 does not receive the broadcast of the Uu interface 120 from the master gNodeB 204.

The master gNodeB 204 and the secondary gNodeB 206 may be configured for multi-frequency operation of the Uu interfaces. In this regard, both the master gNodeb 204 and the secondary gNodeB 206 can be operated in any of the bands supported in 5G new radio frequency range 1 (FR1) of between 450 MHz to 6 GHz and 5G new radio frequency range 2 (FR2) of between 28 GHz to 71 GHz or another frequency band of 5G new radio. This can be achieved by appropriately configuring the Master Cell Group (MCG) and Secondary Cell Group (SCG)

Referring now to FIGS. 2B-2C, the communication system 200 is further described, in accordance with one or more embodiments of the present disclosure. In some embodiments, the communication system 200 may further include one or more of traffic adapter 226, spectral sensor 228, and spectral sensor 230.

In some instances, the communication system 200 is hosted in an environment which includes spectral interference. For example, the spectral interference may be introduced by an enemy jammer. The enemy jammer may emit jamming signals, intended to deny 5G cellular waveforms. The jamming signals may include a footprint. The jamming signal may cause Uu interfaces within the footprint to be denied. For example, the enemy jammer may selectively provide the footprint of the jamming signal to deny a Uu interface between the master gNodeB 204 and the UE 208.

The mobile platform 216 may include the spectral sensor 228 (see FIG. 2B). Similarly, the mobile platform 218 may include the spectral sensor 230 (see FIG. 2C). The spectral sensors may detect one or more of spectral interference or jammer presence. The signals indicative of the spectral interference and the jammer presence may then be provided from the spectral sensors to the network controller 210 (e.g., by a physical interface, or a transmission by way of the tactical radio 214). The network controller 210 may then adjust a robustness of the communication system 200 in response to the spectral interference or jammer presence. For example, the network controller 210 may reconfigure various interfaces, such as, but not limited to, the Xn-C interface from being transmitted according to a 5G communication protocol to be transmitted according to the protocol selected from the DoD Communication Waveform Inventory (2020) in response to the spectral interference.

The network controller 210 may reconfigure the frequencies used by the master gNodeB 204, the secondary gNodeB 206, and the UE 208 based on the frequencies defined in the master cell group and the secondary cell group. The network controller 210 may automatically adjust the modulation order depending on the data rate that can be sustained. The robustness of the messages exchanged between the network 222 and the UE 208 is controlled by the network controller 210 and the traffic adapter 226. The network controller analyzes the jamming threat and instruct the traffic adapter to increase the robustness of the messages exchanged by a combination of a series of repeats and coding. The network controller also sends a control message to the application ensure that messages originating and terminating at the UE 208 can be appropriately encoded and decoded. Resource allocation or subcarrier allocation to the UE 208, is not controlled as part of the 5G standard. Instead, each gNodeB may include an algorithm that improves resource or subcarrier utilization. To make it more difficult for the jammer to target the uplink and downlink resources, the allocation cannot be contiguous but should be spaced disjointly resembling pseudo frequency hopping. The gNodeB may periodically change the radio access bearer allocation which determines the number of subcarriers allocated, the location of the subcarriers, and the like. The periodicity can be controlled by a network controller 210 based on the jamming threat.

When a node is not subject to jamming, the Network Controller 210 configures the master gNodeB 204 and the secondary gNodeB 206 to deliver traffic to the UE 208 at a higher throughput, for increasing (up to double) the network capacity. When the node is subject to jamming, the network controller 210 configures the master gNodeB 204 and the secondary gNodeB 206 to deliver redundant (traffic duplication) control signaling plane and user traffic planes to the UE 208. The network controller may also reconfigure a frequency of the Uu interface 120 and the Uu interface 122 within a frequency band of 450 MHz to 6 GHz or within a frequency band of 28 GHz to 71 GHz, or another frequency band of 5G new radio. The frequency may thus be configured to avoid a frequency of the spectral interference.

The network controller 210 may also configure the frequency band and operational mode of the tactical waveform 220 to deliver the required anti-jam and spectral emission control to ensure that the connectivity between master gNodeB 204 and secondary gNodeB 206 is maintained. A robustness of the traffic channel may be increased without impacting the 5G standards. The robustness of the traffic channel may be increased by externally using a combination of a series of repeats and coding to get the required robustness. Such robustness may be provided at the expense of per user data throughput and network capacity. Since the traffic channel is transported using a given percentage (e.g., 85%) of communication resources or subcarriers, appropriate subcarrier allocation per user will ensure that the enemy has to jam more than 60% of the traffic resources to deny the traffic channel on both the MN link and the SN link to deny communication—which requires an order of magnitude more jamming EIRP and complexity.

Since the robustness of the control channels for the Uu interface 122 of the secondary gNodeB 206 has not been increased, the Uu coverage area of the secondary gNodeB 206 may be based, at least in part, on the effective isotropic radiated power (EIRP) of the jamming signals of the enemy jammer. Where the secondary gNodeB 206 is housed in the mobile platform 218, the secondary gNodeB 206 may be moved around the environment. In some embodiments, the secondary gNodeB 206 is selectively positioned in the environment based on the footprint of the jamming signal. The selective positioning may include positioning the secondary gNodeB 206 such that the UE 208 receives 5G connectivity to the 5G core network 202 by way of the secondary gNodeB 206. Tactical network planning may involve considering the number of the enemy jammers and the EIRP of the jamming signals from the enemy. Subsequent to planning the network, the mobile platform may be deployed to a selected position to ensure cellular connectivity for the UE. Thus, cellular connectivity may be restored.

The network controller 210 may evaluate the effectiveness of the jammer(s) in the network and periodically move the mobile platform 216 or the mobile platform 218 to ensure that a minimal number of UE nodes in the network are denied. For example, determine a desired position for the mobile platform 216 or the mobile platform 218 based on the spectral interference. The network controller 210 may determine the desired position by solving a constrained joint optimization problem that considers the jammers impact, location of the master gNodeB, location of the secondary gNodeB, locations of the UE nodes, frequencies supported by the master gNodeB, frequencies supported by the secondary gNodeB, and frequencies supported by the UE nodes. The desired position may be determined to reduce a number of the UEs in the 5G network which are denied from connecting to the master gNodeB 204 or the secondary gNodeB 206. Upon solving the constrained joint estimation problem, the network controller 210 may cause the mobile platform 216 or the mobile platform 218 to move to a position which maximizes the number of UE nodes with service and aggregate network throughput and capacity. To cause the mobile platform 218 to move to the desired position, the network controller 210 may communicate the desired position to the master gNodeB 204. The master gNodeB 204 may then cause the tactical radio 212 to transmit a signal indicative of the desired position to the mobile platform 218. In response to receiving the signal of the desired position (e.g., by way of the tactical radio 214) the first mobile platform is moved to the desired position.

In some embodiments, the network controller 210 may increase a robustness of the control channel of the Uu interface 120, 122. However, increasing the robustness of the control channel of the Uu interface 120, 122 may require a change to the 5G standards and a change to the ASIC of the UE 208, accompanied with reduction in number of users that can be supported in the network. However, increasing the robustness of the 5G control channels between the gNodeB and the UE may be desirable to enable the use of 5G communications in an environment with spectral interference.

Figure 3:
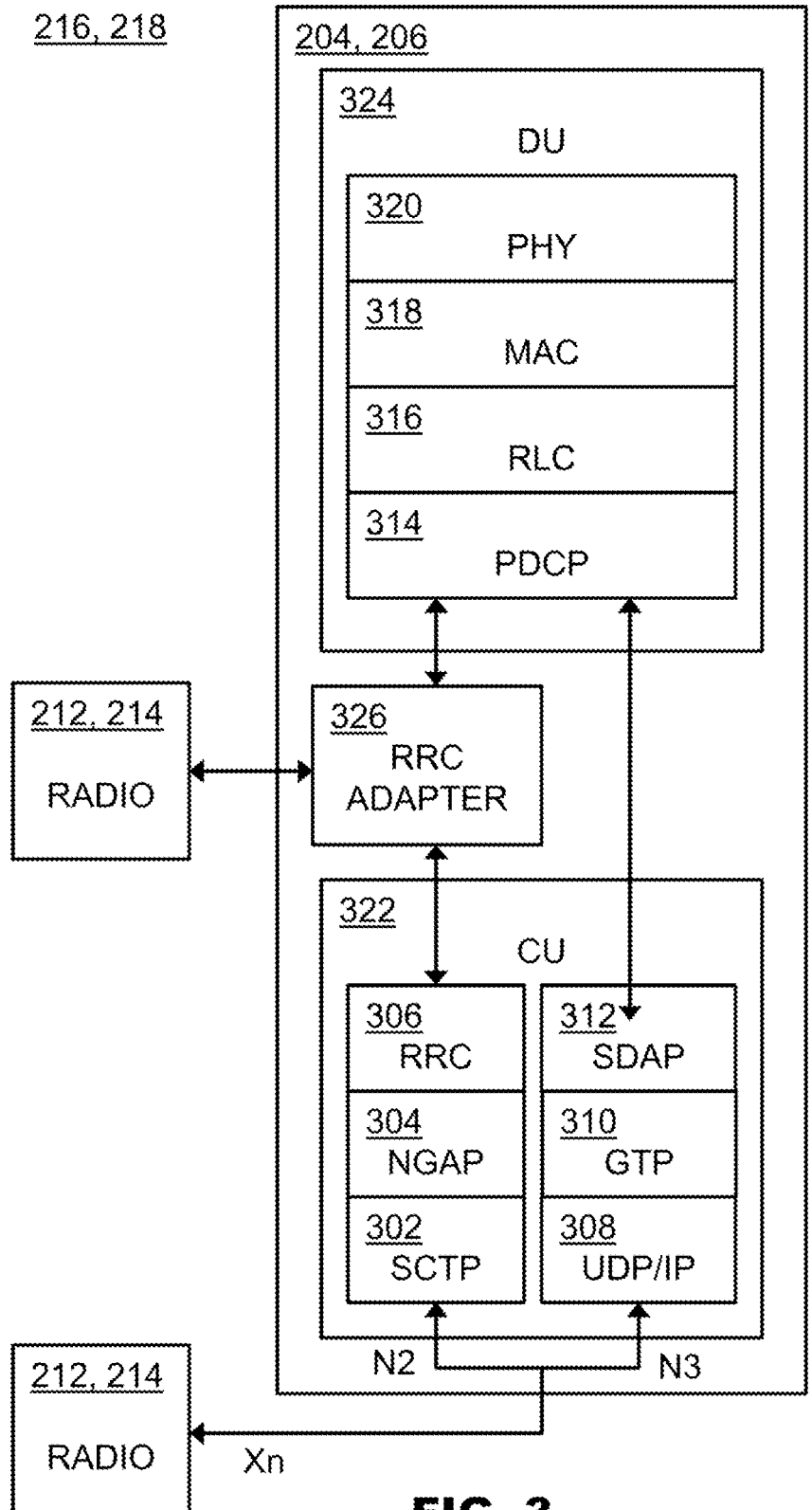
FIG. 3 depicts a simplified schematic diagram of a protocol stack of a gNodeB, in accordance with one or more embodiments of the present disclosure.

Referring now to FIG. 3, the mobile platform 216 and the mobile platform 218 are further described, in accordance with one or more embodiments of the present disclosure.

The master gNodeB 204 and the secondary gNodeB 206 may execute functions (e.g., by one or more processors executing processor executable code stored on a memory) according to a 5G protocol stack. The 5G protocol stack may include a number of layers. In some instances, the 5G protocol stack is split between a control plane (N2) and a user plane (N3). As depicted, the control plane and the user plane may be communicated to the gNodeB by the Xn interface (e.g., the Xn-U interface and the Xn-C interface) and then separated for processing among the control plane (N2) and the user plane (N3). The control plane portion of the 5G protocol stack may include a stream control transmission protocol (SCTP) layer 302, a next generation application protocol (NGAP) layer 304, and a radio resource control (RRC) layer 306. The user plane portion of the 5G protocol stack may include a universal datagram protocol or internet protocol (UDP/IP) layer 308, a general packet radio service (GPRS) tunneling protocol (GTP) layer 310, and a service data adaption protocol (SDAP) layer 312. The control plane portion and the user plane portion of the 5G protocol stack may also share one or more layers, such as, but not limited to, a packet data convergence protocol (PDCP) layer 314, a radio link control (RLC) layer 316, a media access control (MAC) layer 318, and a physical (PHY) layer 320.

A tactical communication system is described in U.S. patent application Ser. No. 17/443,536, issued as U.S. Pat. No. 11,889,399, titled MILITARY CENTRAL UNITS AND DISTRIBUTED UNITS, filed Jul. 27, 2021, naming John V. Thommana and James A. Stevens as inventors. Said application Ser. No. 17/443,536 is incorporated herein by reference in the entirety.

The concept of splitting radio access networks was introduced as part of the OpenRAN initiative, as part of 3GPP Release 14. The communication system leverages the functional splits to enable the incorporation of tactical networks as part of the 5G network to create a seamless tactical heterogenous network in contested theaters. In this regard, the functions may be split among a centralized unit (CU) 322 and a distributed unit (DU) 324. The components of the protocol stack may be divided into as many as eight different areas or options. For example, in an option 1, SCTP layer 302, the NGAP layer 304, the RRC layer 306, the UDP/IP layer 308, the GTP layer 310, and the SDAP layer 312 may be performed by the centralized unit 322; with the PDCP layer 314, RLC layer 316, MAC layer 318, and PHY layer 320, along with RF processing, performed by the distributed unit 324 (as depicted in FIG. 3). Splitting the first radio access network via option 1 allows non-cellular protocols, such as the Common Data Link protocol or another protocol from the DoD Communication Waveform Inventory, to interface between the master gNodeB 204 and the secondary gNodeB 206 without the need to add or remove 5G-related header and control information, potentially simplifying communication and decreasing latency. While the communication system utilizes the option 1 in contested areas, the communication system may utilize any other split in non-contested areas.

Other splits within the gNodeB may be utilized. For example, an option 2 may be similar to the option 1, except that the PDCP layer 314 may be performed by the centralized unit 322. However, these splits may increase the complexity and/or latency of communication between the master gNodeB and the secondary gNodeB. For example, splitting the radio access network via option 2 would require adding and/or removing 5G-related headers and control information when communicating via non-cellular waveforms selected from the DoD Communication Waveform Inventory, potentially increasing communication complexity and latency.

In some embodiments, one or more of the master gNodeB 204 and the secondary gNodeB 206 may include an open virtualized radio access network (open vRAN) architecture. The open vRAN may allow for splitting the protocol stack between the centralized unit 322 and the distributed unit 324. Distributing the 5G protocol stack processing may be advantageous for facilitating open interfaces between nodes. In this regard, either or both of the master gNodeB 204 and the secondary gNodeB 206 may include the centralized unit 322 and the distributed unit 324.

Each of the master gNodeB 204 and the secondary gNodeB 206 may further include a radio resource control (RRC) adapter 326. The RRC adapter 326 may be communicatively coupled to the tactical radio 212, 214 of the associated gNodeB. The RRC adapter 326 may intercept control traffic between the RRC layer 306 and the PDCP layer 314. The RRC adapter 326 may then be reconfigured from allowing the traffic to pass for transmission by a 5G protocol to generate duplicate control traffic and route the duplicate control traffic to the tactical radio 212, 214. By intercepting the control traffic between the RRC layer 306 and the PDCP layer 314, a 5G header may not be required to be removed from the control traffic. The availability of virtualized Open Radio Access Networks from sources, such as, but not limited to, Mavenir, allow for changes to be introduced that do not incur 5G interoperability issues. Thus, the protocol layers of the centralized unit 322 (e.g., STCP layer 302, NGAP layer 304, RRC layer 306, UDP/IP layer 308, GTP layer 310, or SDAP layer 312) may be performed by the master gNodeB 204 and the protocol layers of the distributed unit 324 (e.g., PDCP layer 314, RLC layer 316, MAC layer 318, or PHY layer 320) may be performed by the secondary gNodeB 206. Thus, a control signal may be transported between the gNodeBs using an out-of-band control channel selected from the DoD Communication Waveform Inventory.

Figure 4:
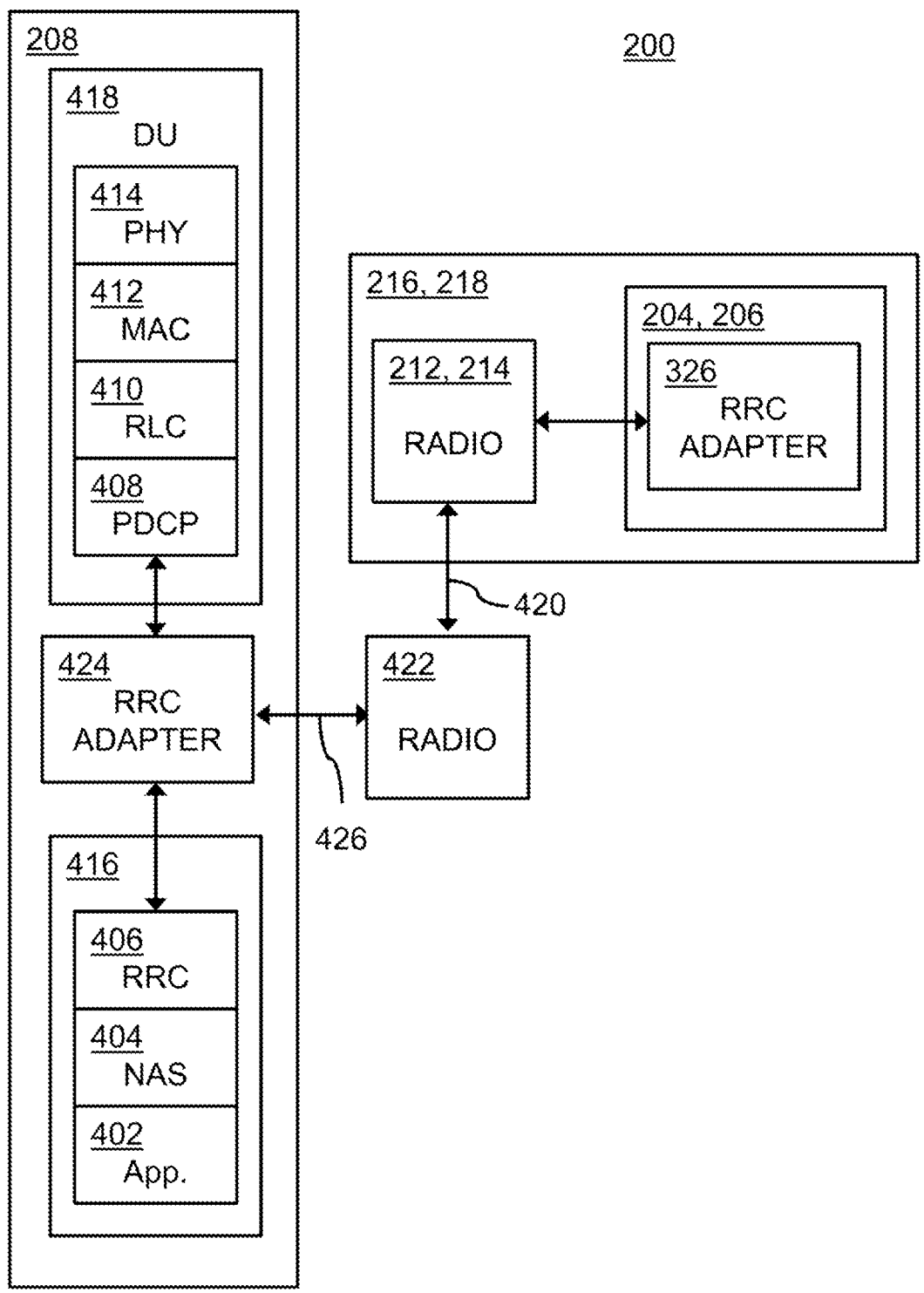
FIG. 4 depicts a simplified schematic diagram of a communication system, in accordance with one or more embodiments of the present disclosure.

Referring now to FIG. 4, the communication system 200 is described, in accordance with one or more embodiments of the present disclosure. The communication system 400 may generally describe a tactical multi-RAT dual connectivity deployment scenario. FIG. 4 illustrates how an out-of-band 5G control channel can be supported between the UE 208 and one or more of the master gNodeB 204 or the secondary gNodeB 206. The out-of-band 5G control channel may be provided in addition to the 5G in-band control channel using robust tactical radios and waveforms. Thus, although FIG. 4 does not depict various features of FIGS. 2A-3, such as, but not limited to, the in-band Uu interfaces between the UE and the gNode, the Xn interfaces between the gNodeB, or the interface with the external network, this is not intended as a limitation of the present disclosure.

In embodiments, a standardized Multi-RAT (Radio Access Technology) Dual Connectivity (MR-DC) capability of 5G may be augmented with tactical waveforms. By augmenting the MR-DC capability of 5G with the tactical waveforms a robust tactical 5G network may be created. The robust tactical 5G network may be operated in a contested environment. To extract or inject out-of-band control channel messages, the UE 208 may include the RRC adapter 424 between the RRC layer 406 and the PDCP layer 408.

The UE 208 may execute functions (e.g., by one or more processors executing processor executable code stored on a memory) according to a 5G protocol stack. The 5G protocol stack may include a number of layers. In some instances, the 5G protocol stack is split between a control plane (N2) and a user plane (N3). The control plane and the user plane may be communicated from the gNodeB to the UE by the Uu interface 122. The control plane portion of the 5G protocol stack may include a stream control application layer 402, a non-access stratum (NAS) layer 404, and a radio resource control (RRC) layer 406. The user plane portion of the 5G protocol stack may include any 5g layers known in the art. The control plane portion and the user plane portion of the 5G protocol stack may also share one or more layers, such as, but not limited to, a packet data convergence protocol (PDCP) layer 408, a radio link control (RLC) layer 410, a media access control (MAC) layer 412, and a physical (PHY) layer 414.

In some embodiments, the control plane and the user plane are communicated to the UE 208 by a tactical waveform 420. The tactical waveform 420 may include an out-of-band control signaling plane. The tactical waveform 420 may be transmitted according to the CDL protocol or another protocol from the DoD Communications Waveform Inventory. In some embodiments, the communication system 200 further includes a tactical radio 422 and an RRC adapter 424. The tactical radio 422 may be similar to the tactical radio 212 and the tactical radio 214. The RRC adapter 404 may be similar to the RRC adapter 326. The RRC adapter 424 may intercept control traffic between the RRC layer 406 and the PDCP layer 408. The RRC adapter 424 may then generate duplicate control traffic and routed the duplicate control traffic to the tactical radio 422 By intercepting the control traffic between the RRC layer 406 and the PDCP layer 408, a 5G header may not be required to be removed from the control traffic.

The tactical radio 422 may receive the tactical waveform 420 from one or more of the tactical radio 212 or the tactical radio 214. The tactical radio 422 may then demodulate the tactical waveform 420 based on the protocol selected from the DoD Communication Waveform Inventory, and provide the demodulated signal to the RRC adapter 424. The UE 208 and the tactical radio 422 may be coupled by a connectivity interface 426. For example, the connectivity interface 426 may include physical interface, such as, but not limited to, Ethernet or USB connection.

In some embodiments, the out-of-band control channel is further transported in parallel with the Uu interface 120, 122. The RRC adapter 424 may then capture control messages going from the PDCP layer 408 to the RRC layer 406 (e.g., aggregated control signaling plane), and similarly capture the control messages going from the radio 422 to the RRC layer 406 (e.g., the out-of-band signaling plane). The RRC adapter 424 may then provide only one copy of the control message to the RRC layer 406, ensuring that only one copy of the message (either in-band or out-of-band) is forwarded for processing. By the RRC adapter 424, the tactical radio 422, and one or more of the tactical radio 212 or the tactical radio 214, a control signal may be transported between the gNodeB and the UE 208 using an out-of-band control channel. The in-band and out-of-band control channels may increase a likelihood of the UE 208 receiving control signaling for establishing a communication link with one or more of the master gNodeB 204 or the secondary gNodeB 206.

A high data rate low latency tactical waveform may be used to support the out-of-band control channel 420. In a 5G network the total control traffic can be as much as 15% of the total traffic supported by the network. In order to ensure that the RRC adapter 424 and RRC adapter 326 can function properly, the latency between the arrival of message over the in-band and out-of-band network should be negligible. Hence the tactical waveform has to support all the broadcast/shared control traffic as well as per user RRC traffic.

Referring generally again to FIGS. 2A through 4.

Although the Xn interface provided between the master gNodeB and the secondary gNodeB has been described as being transmitted according to a Common Data Link (CDL) protocol, this is not intended as a limitation of the present disclosure. It is contemplated that the Xn interface may be transmitted according to a number of waveform protocols. For example, the Xn interface may be transmitted according to a Protected Tactical Waveform (PTW) protocol, Bandwidth Efficient Common Data Link (BE-CDL) protocol, Tactical Targeting Network Technology (TTNT) protocol, or a Link-16 protocol, or another protocol selected from the DoD Communication Waveform Inventory (2020).

Although the UE has been described as connecting to the gNodeBs by Multi-RAT dual connectivity, this is not intended as a limitation on the present disclosure. Today 5G UEs are available that support 8 to 12 independent channels for operation. Supporting simultaneous multi-frequency transmissions from the master gNodeB and secondary gNodeB ensures that each UE can get access to service over any two of the channels supported by the master gNodeB, the secondary gNodeB, and the UE. As the UE capabilities increase and migrate from dual-channel connectivity to multi-channel connectivity the network robustness increases as it forces the enemy to jam more frequencies as each of the secondary gNodeB connectivity with the UE can be in a different frequency band.

Although much of the present disclosure is directed to 5G new radio (5G NR), this is not intended as a limitation of the present disclosure. Multi-RAT dual connectivity is also supported over a Long-Term Evolution (LTE) wireless broadband communication standard. Thus, the concepts of the present disclosure also apply to LTE with appropriate changes from the 5G NR interfaces to the LTE interfaces.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

One or more of the gNodeB or the UE may include memory and processor(s). The memory may include any storage medium known in the art. For example, the memory may include a non-transitory memory medium. For instance, the memory may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). In an alternative embodiment, the memory may be located remotely with respect to the physical location of the processor. In another embodiment, the memory maintains program instructions for causing the processor(s) to carry out the various steps described through the present disclosure.

The processors may include any processing unit known in the art. For example, the processors may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processor(s).

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A communication system comprising:
a fifth generation (5G) core network communicatively coupled to at least one of a secret internet protocol router network (SIPRNet) or a non-classified internet protocol router network (NIPRNet);
a master 5G base station node (gNodeB) communicatively coupled to the 5G core network by a control plane interface (N2) and a user traffic plane interface (N3);
a first mobile platform including:
a secondary gNodeB, wherein the secondary gNodeB is communicatively coupled to the master gNodeB by an Xn control plane (Xn-C) interface and an Xn user plane (Xn-U) interface, wherein at least the Xn-C interface is transmitted according to a protocol selected from the Department of Defense (DoD) Communications Waveform Inventory; and
at least one user equipment (UE), wherein the at least one UE is communicatively coupled to the master gNodeB by a first Uu interface, wherein the at least one UE is communicatively coupled to the secondary gNodeB by a second Uu interface, wherein each of the first Uu interface and the second Uu interface include a control signaling plane and a user traffic plane, wherein the at least one UE is configured to generate an aggregated control signaling plane by aggregating the control signaling plane of the first Uu interface and the second Uu interface by multiple radio access technology (RAT) dual connectivity (MR-DC);
wherein the protocol is a Bandwidth Efficient Common Data Link (BE-CDL) protocol, wherein the Xn-C interface is transmitted in a band, wherein the band is one of an L band, an S band, a C band, an X band, a Ku band, or a Ka band;
wherein the band is outside of a 5G new radio frequency range 1 (FR1) of between 450 MHz to 6 GHz; wherein the band is outside of a 5G new radio frequency range 2 (FR2) of between 28 GHz to 71 GHz.

2. The communication system of claim 1, further comprising a second mobile platform, wherein the second mobile platform includes the master gNodeB and the 5G core network.

3. The communication system of claim 2, wherein the second mobile platform includes a tactical radio communicatively coupled to the master gNodeB; wherein the tactical radio is configured to transmit at least the Xn-C interface according to the protocol selected from the DoD Communications Waveform Inventory.

4. The communication system of claim 3, wherein the master gNodeB includes a 5G protocol stack including a radio resource control (RRC) layer and a packet data convergence protocol (PDCP) layer; wherein the master gNodeB further includes a RRC adapter communicatively coupled to the tactical radio; wherein the RRC adapter is configured to intercept control traffic going from the RRC layer to the PDCP layer, generate duplicate control traffic, and forward the duplicate control traffic to the tactical radio; wherein the tactical radio is configured to transmit at least the Xn-C interface according to the protocol selected from the DoD Communications Waveform Inventory based on the duplicate control traffic.

5. The communication system of claim 2, wherein the second mobile platform includes a network controller; wherein at least one of the first mobile platform or the second mobile platform includes a spectral sensor configured to detect a spectral interference and communicate the spectral interference to the network controller.

6. The communication system of claim 5, wherein the network controller reconfigures at least the Xn-C interface from being transmitted according to a 5G communication protocol to be transmitted according to the protocol selected from the DoD Communications Waveform Inventory in response to the spectral interference.

7. The communication system of claim 5, wherein the network controller reconfigures the user traffic plane of the second Uu interface to duplicate the user traffic plane of the first Uu interface in response to the spectral interference; wherein the network controller reconfigures a frequency of the first Uu interface and the second Uu interface within a frequency band of 450 MHz to 6 GHz or within a frequency band of 28 GHz to 71 GHz to avoid a frequency of the spectral interference.

8. The communication system of claim 5, wherein the network controller is configured to determine a desired position for the first mobile platform based on the spectral interference; wherein the desired position is transmitted to the first mobile platform; wherein the first mobile platform is moved to the desired position in response to receiving the desired position.

9. The communication system of claim 5, further comprising a traffic adapter configured to increase a robustness of the user traffic plane of the first Uu interface and the second Uu interface by adding a series of repeats to the user traffic plane.

10. The communication system of claim 1, further comprising a first tactical radio communicatively coupled to the UE by a physical interface; the first mobile platform further comprising a second tactical radio communicatively coupled to the secondary gNodeB; wherein the secondary gNodeB is further configured to transmit an out-of-band control signaling plane to the UE by way of the first tactical radio and the second tactical radio; wherein the out-of-band control signaling plane is transmitted according to the protocol selected from the DoD Communications Waveform Inventory.

11. The communication system of claim 10, wherein the secondary gNodeB includes a 5G protocol stack including a radio resource control (RRC) layer and a packet data convergence protocol (PDCP) layer; wherein the gNodeB further comprises an RRC adapter configured to intercept control traffic going from the RRC layer to the PDCP layer, generate duplicate control traffic, and forward the duplicate control traffic to the second tactical radio; wherein the second tactical radio is configured to transmit the out-of-band control signaling plane according to the protocol selected from the DoD Communications Waveform Inventory based on the duplicate control traffic.

12. The communication system of claim 10, wherein the UE includes a 5G protocol stack including a radio resource control (RRC) layer and a packet data convergence protocol (PDCP) layer; wherein the UE further comprises an RRC adapter which is configured to provide one of the aggregated control signaling plane or out-of-band control signaling plane to the RRC layer.

13. The communication system of claim 1, wherein the Xn-U interface is transmitted according to one of the protocol selected from the DoD Communications Waveform Inventory or a 5G new radio protocol.

* * * * *